United States Patent
Srivastav et al.

(10) Patent No.: US 9,864,527 B1
(45) Date of Patent: Jan. 9, 2018

(54) DISTRIBUTED DATA STORAGE MANAGEMENT

(71) Applicant: EMC Corporation, Hopkinton, MA (US)

(72) Inventors: Shashwat Srivastav, Seattle, WA (US); Vishrut Shah, Redmond, WA (US); Chen Wang, Shanghai (CN); Matthew L. Troutman, Houston, TX (US); Ivan Tchoub, Saint Petersburg (RU); Wei Yin, Shanghai (CN); Jie Song, Shanghai (CN); Maxim S. Trusov, Saint Petersburg (RU); Andrey Fomin, Vsevolozhsk (RU); Karthik Navaneethakrishnan, Bellevue, WA (US); Alexander G. Rakulenko, Saint Petersburg (RU)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 14/319,349

(22) Filed: Jun. 30, 2014

Related U.S. Application Data

(60) Provisional application No. 61/988,603, filed on May 5, 2014, provisional application No. 61/988,796, filed on May 5, 2014.

(51) Int. Cl.
*G06F 12/00* (2006.01)
*G06F 13/00* (2006.01)
(Continued)

(52) U.S. Cl.
CPC ............ *G06F 3/0619* (2013.01); *G06F 3/067* (2013.01); *G06F 3/0611* (2013.01); *G06F 3/0655* (2013.01); *G06F 3/0689* (2013.01)

(58) Field of Classification Search
CPC ...... G06F 3/061; G06F 3/0611; G06F 3/0613; G06F 3/0614–3/0619;
(Continued)

(56) References Cited

U.S. PATENT DOCUMENTS

| | | | | |
|---|---|---|---|---|
| 6,466,978 B1 * | 10/2002 | Mukherjee | .............. | G06F 3/061 |
| | | | | 348/E5.008 |
| 6,889,309 B1 * | 5/2005 | Oliveira | ................ | G06F 3/0607 |
| | | | | 707/E17.01 |

(Continued)

OTHER PUBLICATIONS

ZettaDS: A Light-weight Distributed Storage System for Cluster; Liu et al; The Third ChinaGrid Annual Conference; Aug. 20-22, 2008; pp. 158-164 (7 pages).*

(Continued)

*Primary Examiner* — Daniel C Chappell
(74) *Attorney, Agent, or Firm* — Konrad R. Lee; Krishnendu Gupta

(57) ABSTRACT

A computer-executable method, computer program product, and system of managing I/O requests in a distributed data storage system, wherein the distributed data storage system includes a first node and one or more data storage array, the computer-executable method, computer program product, and system comprising receiving an I/O request at the first node enabled to utilize a storage engine to process the I/O request, wherein the storage engine is comprised of two or more layers, analyzing the I/O request using a first layer of the two or more layers to determine whether the I/O request relates to a portion of metadata managed by the first layer of the two or more layers, and processing the I/O request based on the determination.

6 Claims, 10 Drawing Sheets

(51) Int. Cl.
*G06F 13/28* (2006.01)
*G06F 3/06* (2006.01)

(58) Field of Classification Search
CPC .......... G06F 3/067–3/0689; G06F 5/06; G06F 5/065; G06F 11/1008; G06F 11/1076–11/1096; G06F 11/1446; G06F 11/2056; G06F 12/0866; G11B 19/044; G11B 20/18; H04L 29/08549; H04L 67/1097
See application file for complete search history.

(56) References Cited

U.S. PATENT DOCUMENTS

| | | | | |
|---|---|---|---|---|
| 7,711,897 | B1* | 5/2010 | Chatterjee | G06F 3/0605 711/112 |
| 8,321,643 | B1* | 11/2012 | Vaghani | G06F 3/0604 711/162 |
| 8,429,362 | B1* | 4/2013 | Natanzon | G06F 11/1471 711/161 |
| 8,443,153 | B1* | 5/2013 | Edwards | G06F 17/30091 711/147 |
| 8,510,279 | B1* | 8/2013 | Natanzon | G06F 17/30073 707/697 |
| 8,600,935 | B1* | 12/2013 | Dantkale | G06F 17/30073 707/624 |
| 8,671,265 | B2* | 3/2014 | Wright | G06F 15/173 711/1 |
| 9,003,021 | B2* | 4/2015 | Wright | G06F 3/0613 709/224 |
| 9,396,198 | B2* | 7/2016 | Takaoka | G06F 17/30067 |
| 2006/0112222 | A1* | 5/2006 | Barrall | G06F 3/0607 711/114 |
| 2006/0218199 | A1* | 9/2006 | Kishi | G06F 11/106 |
| 2010/0076805 | A1* | 3/2010 | Batsakis | G06F 9/505 705/35 |
| 2011/0072206 | A1* | 3/2011 | Ross | G06F 17/302 711/108 |
| 2013/0159359 | A1* | 6/2013 | Kumar | G06F 3/0605 707/822 |
| 2014/0325157 | A1* | 10/2014 | Sangapu | G06F 3/061 711/126 |
| 2015/0205668 | A1* | 7/2015 | Sundaram | G06F 11/108 714/6.24 |

OTHER PUBLICATIONS

QuickSilver distributed file services: an architecture for horizontal growth; Cabrera et al; Proceedings of the 2nd IEEE Conference on Computer Workstations; Mar. 7-10, 1999; pp. 23-37 (15 pages).*
Implementation of a Software-Defined Storage Service with Heterogeneous Storage Technologies; Yang et al; IEEE 29th International Conference on Advanced Information Networking and Applications Workshops; Mar. 24-27, 2015; pp. 102-107 (6 pages).*
A reliable object-oriented data repository for a distributed computer system; Svobodova, Liba; Proceedings of the eighth ACM symposium on Operating systems principles; Dec. 14-16, 1981; pp. 47-58 (12 pages).*

* cited by examiner

DISTRIBUTED DATA STORAGE MANAGEMENT

A portion of the disclosure of this patent document may contain command formats and other computer language listings, all of which are subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

CROSS REFERENCE TO RELATED APPLICATIONS

This Application claims priority from U.S. Provisional Patent Application Serial Nos. 61/988,603 entitled "DISTRIBUTED DATA STORAGE MANAGEMENT" and 61/988,796 entitled "ZONE CONSISTENCY" filed on May 5, 2014 the content and teachings of which are hereby incorporated by reference in their entirety.

This Application is related to U.S. patent application Ser. No. 14/319,360 entitled "DISTRIBUTED METADATA MANAGMENT" Ser. No. 14/319,368 entitled "SCALABLE DISTRIBUTED STORAGE SYSTEM INFRASTRUCTURE" Ser. No. 14/319,378 entitled "DISTRIBUTED DATA STORAGE MANAGEMENT" Ser. No. 14/319,383 entitled "DATA BACKUP MANAGEMENT ON DISTRIBUTED STORAGE SYSTEMS" Ser. No. 14/319,113 entitled "ZONE CONSISTENCY", and Ser. No. 14/319,117 entitled "ZONE CONSISTENCY" filed on even date herewith, the teachings of which applications are hereby incorporated herein by reference in their entirety.

TECHNICAL FIELD

This invention relates to data storage.

BACKGROUND

Computer systems are constantly improving in terms of speed, reliability, and processing capability. As is known in the art, computer systems which process and store large amounts of data typically include a one or more processors in communication with a shared data storage system in which the data is stored. The data storage system may include one or more storage devices, usually of a fairly robust nature and useful for storage spanning various temporal requirements, e.g., disk drives. The one or more processors perform their respective operations using the storage system. Mass storage systems (MSS) typically include an array of a plurality of disks with on-board intelligent and communications electronics and software for making the data on the disks available.

Companies that sell data storage systems and the like are very concerned with providing customers with an efficient data storage solution that minimizes cost while meeting customer data storage needs. It would be beneficial for such companies to have a way for reducing the complexity of implementing data storage.

SUMMARY

A computer-executable method, computer program product, and system of managing I/O requests in a distributed data storage system, wherein the distributed data storage system includes a first node and one or more data storage array, the computer-executable method, computer program product, and system comprising receiving an I/O request at the first node enabled to utilize a storage engine to process the I/O request, wherein the storage engine is comprised of two or more layers, analyzing the I/O request using a first layer of the two or more layers to determine whether the I/O request relates to a portion of metadata managed by the first layer of the two or more layers, and processing the I/O request based on the determination.

BRIEF DESCRIPTION OF THE DRAWINGS

Objects, features, and advantages of embodiments disclosed herein may be better understood by referring to the following description in conjunction with the accompanying drawings. The drawings are not meant to limit the scope of the claims included herewith. For clarity, not every element may be labeled in every figure. The drawings are not necessarily to scale, emphasis instead being placed upon illustrating embodiments, principles, and concepts. Thus, features and advantages of the present disclosure will become more apparent from the following detailed description of exemplary embodiments thereof taken in conjunction with the accompanying drawings in which:

Like reference symbols in the various drawings indicate like elements.

DETAILED DESCRIPTION

Figure 1:
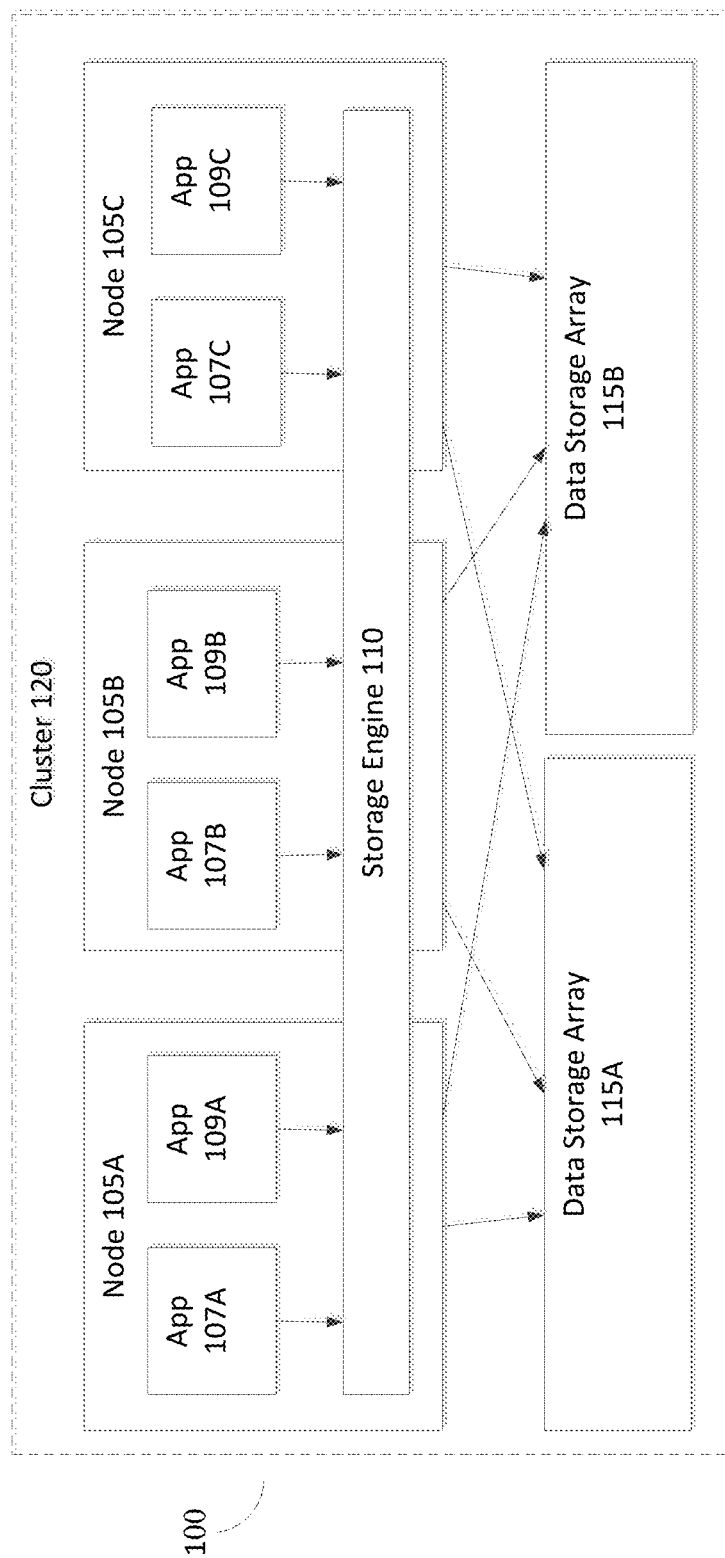
FIG. 1 is a simplified illustration of a distributed data storage system, in accordance with an embodiment of the present disclosure.

Traditionally, distributed data storage systems are managed by a single node and/or module within the distributed data storage system. Conventionally, control by a single node makes a distributed data storage system vulnerable to downtime due to node failure. Typically, control by a single node makes a distributed data storage system constrained by an ability of a single node to manage data I/O requests made within the distributed data storage system. Conventionally, improving the ability to manage data I/O requests within a distributed data storage system would be beneficial to the data storage system industry.

In many embodiments, the current disclosure may enable a distributed data storage system to be implemented using one or more horizontal service layers. In various embodiments, a distributed data storage system may include one or more clusters and/or zones of data storage systems. In certain embodiments, a cluster and/or zone may include one or more compute nodes in communication with one or more data storage arrays. In most embodiments, the current disclosure may enable division of functionality within a distributed data storage system which may enable better scalability across compute nodes. In various embodiments, the current disclosure may enable division of functionality within a cluster and/or zone of a distributed data storage system. In various embodiments, a distributed data storage system may be enabled to operate on and/or manage data in object, file, and/or other data formats.

In many embodiments, the current disclosure may enable a data storage system to manage meta data in a distributed manner. In various embodiments, the current disclosure may enable one or more nodes in a data storage system to manage meta data in the data storage system. In certain embodiments, each node in a data storage system may be enabled to manage a portion of meta-data in the data storage system. In most embodiments, the current disclosure may enable implementation of a storage engine which may enable distributed management of metadata within a distributed data storage system. In various embodiments, a storage engine may be implemented on each node of a distributed data storage system. In certain embodiments, each storage engine on each node may be enabled to communicate with one or more nodes in a distributed data storage system. In other embodiments, each storage engine on each node may be enabled to communicate with one or more nodes in a zone and/or cluster of a distributed data storage system.

In many embodiments, a storage engine may include one or more layers. In various embodiments, layers within a storage engine may include a transaction layer, index layer, chunk management layer, storage server management layer, partitions record layer, and/or a storage server (Chunk I/O) layer. In certain embodiments, a transaction layer may parse received object request from applications within a distributed data storage system. In most embodiments, a transaction layer may be enable to read and/or write object data to the distributed data storage system. In some embodiments, data written to a distributed data storage system may be in a chunk format which may be portions of data storage of a specified size (i.e. 64 mb/125 mb). In many embodiments, an index layer may be enabled to map file-name/data-range to data stored within the distributed data storage system. In various embodiments, an index layer may be enabled to manage secondary indices which may be used to manage data stored on the distributed data storage system.

In many embodiments, a chunk management layer may manage chunk information, such as, but not limited to, location and/or management of chunk metadata. In various embodiments, a chunk management layer may be enabled to execute per chunk operations. In certain embodiments, a storage server management layer may monitor the storage server and associated disks. In most embodiments, a storage server management layer may be enabled to detect hardware failures and notify other management services of failures within the distributed data storage system. In some embodiments, a partitions record layer may record an owner node of a partition of a distributed data storage system. In many embodiments, a partitions record layer may record metadata of partitions, which may be in a btree and journal format.

In most embodiments, a storage server layer may be enabled to direct I/O operations to one or more data storage arrays within the distributed data storage system. In various embodiments, a chunk manager service may select which storage server may be utilized for received I/O requests. In certain embodiments, a storage server manager service may be utilized to select disks to be utilized on storage servers selected by the chunk manager service. In most embodiments, once a chunk manager server and storage server manager service has initially processed an I/O request, a transaction layer may be enabled to access one or more storage servers based on the chunk manager service and/or storage server manager service directives.

In many embodiments, a chunk management layer of a node may receive I/O requests related to metadata and/or data not managed by the chunk management layer. In various embodiments, received I/O requests unrelated to metadata and/or data managed by a chunk management layer may be enabled to be forwarded to a node within a cluster that may be enabled to process the received I/O request. In certain embodiments, a chunk management layer may be enabled to query for information related to which node in a cluster manages different portions of metadata and/or data within the cluster.

Refer to the example embodiment of FIG. 1. FIG. 1 is a simplified illustration of a distributed data storage system, in accordance with an embodiment of the present disclosure. As shown, distributed data storage system 100 includes cluster 120 which includes Node (105A-C, 105 Generally), and Data Storage Arrays (115A-B, 115 Generally). Node 105A is in communication with data storage array 115A and Data storage Array 115B. Node 105B is in communication with data storage array 115A and 115B. Node 105C is in communication with data storage array 115A and Data storage Array 115B. In FIG. 1, storage engine 110 is executed on each node 105. storage engine 110 enables Applications 107A, 109A, 107B, 109B, 107C, 109C to execute data I/O requests to and from distributed data storage system 100. In various embodiments, a distributed data storage system may include one or more clusters which may be located in one or more locations.

Figure 2:
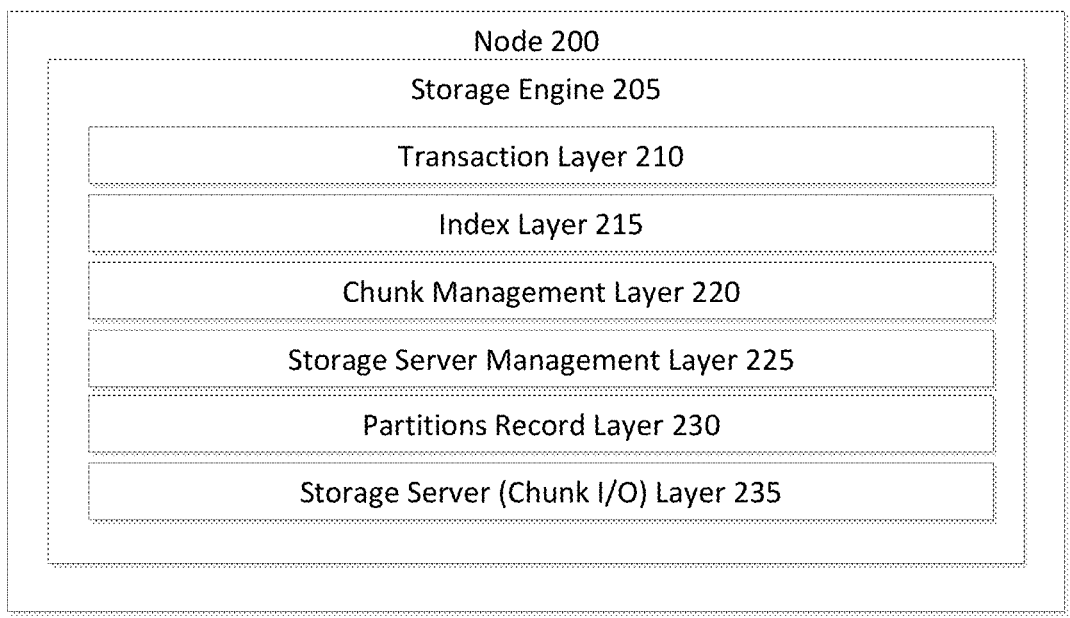
FIG. 2 is a simplified illustration of a node within a cluster of a distributed data storage system, in accordance with an embodiment of the present disclosure.

Refer to the example embodiment of FIG. 2. FIG. 2 is a simplified illustration of a node within a cluster of a distributed data storage system, in accordance with an embodiment of the present disclosure. As shown, Node 200 executes storage engine 205. Storage engine 205 includes multiple layers for management of node 200 within a distributed data storage system. Storage engine 205 includes transaction layer 210, index layer 215, chunk management layer 220, storage server management layer 225, partitions record layer 230, and storage server layer 235. One or more layers within storage engine 205 on node 200 are enabled to communicate with other nodes in a cluster of a distributed data storage systems. In various embodiments, one or more layers within a storage engine on a node may be enabled to communicate with other nodes in one or more other clusters of a distributed data storage system.

Figure 3:
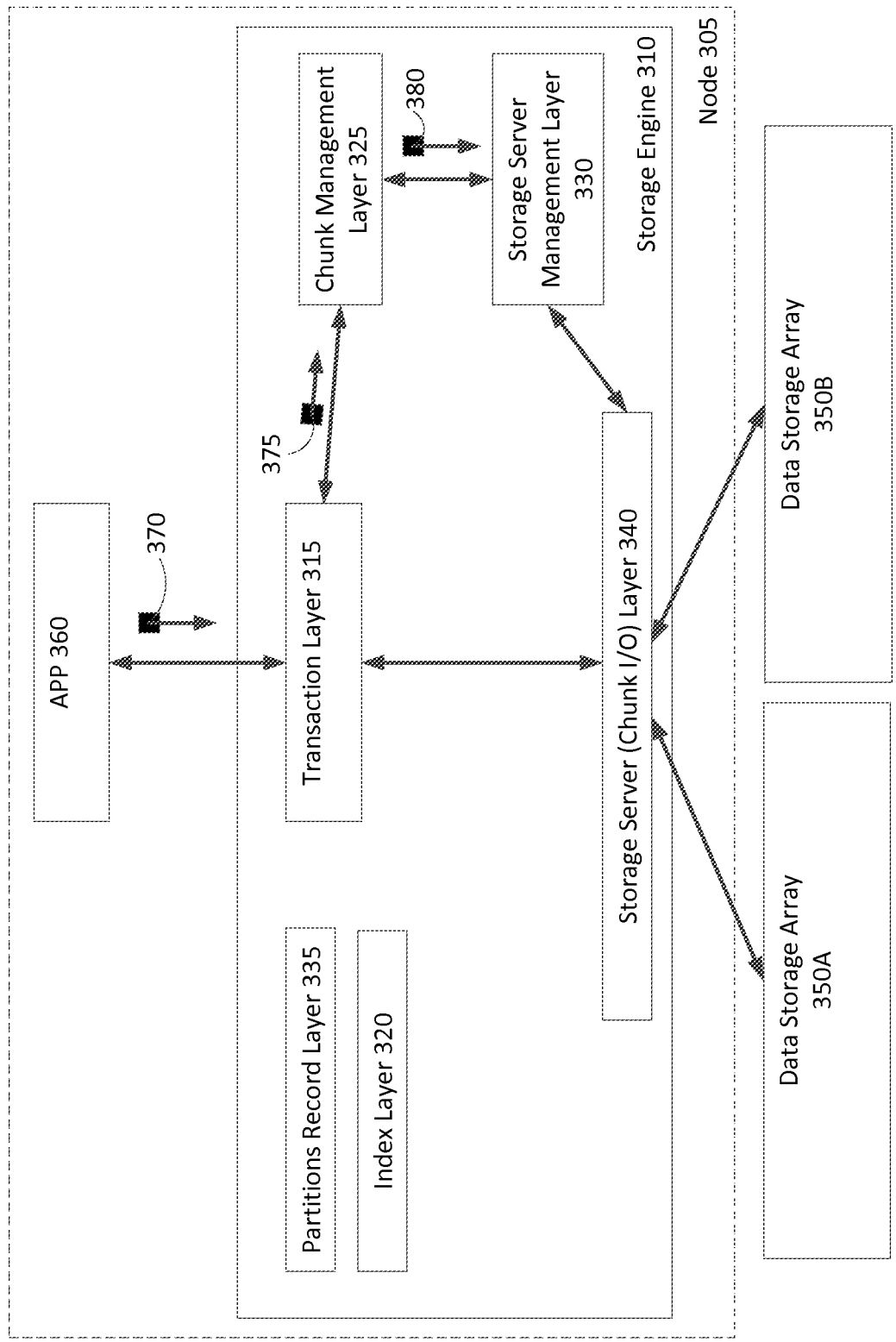
FIG. 3 is a simplified illustration of a node within a distributed data storage system processing a data I/O request, in accordance with an embodiment of the present disclosure.

Refer to the example embodiment of FIG. 3. FIG. 3 is a simplified illustration of a node within a distributed data storage system processing a data I/O request, in accordance with an embodiment of the present disclosure. As shown, node 305 is executing application 360 and storage engine 310. Storage engine 310 includes partitions record layer 335, index layer 320, transaction layer 315, chunk layer 325, storage server management layer 330 and storage server layer 340. Storage engine 310 is enabled to communicate with storage engines running on other nodes within a distributed data storage system.

As shown, Application 360 has sent data I/O write request to storage engine 310 using message 370. Transaction layer 315 receives message 370 and sends a request to chunk management layer 325 using message 375 to allocate space within the distributed data storage system. Chunk management layer 325 determines whether the data I/O write request is sent to data storage array 350A or data storage array 350B. Chunk management layer 325 allocates data storage array 350A for data I/O write request in message 370. Chunk management layer 325 request allocation on a portion of data (i.e. one or more chunks) from data storage array 350A. Chunk management layer 325 sends request to storage server management layer 330 using message 380. Storage server management layer 330 determines which portions of data storage array 350A are available and allocations portions of data storage array 350A for use by Application 360.

Figure 4:
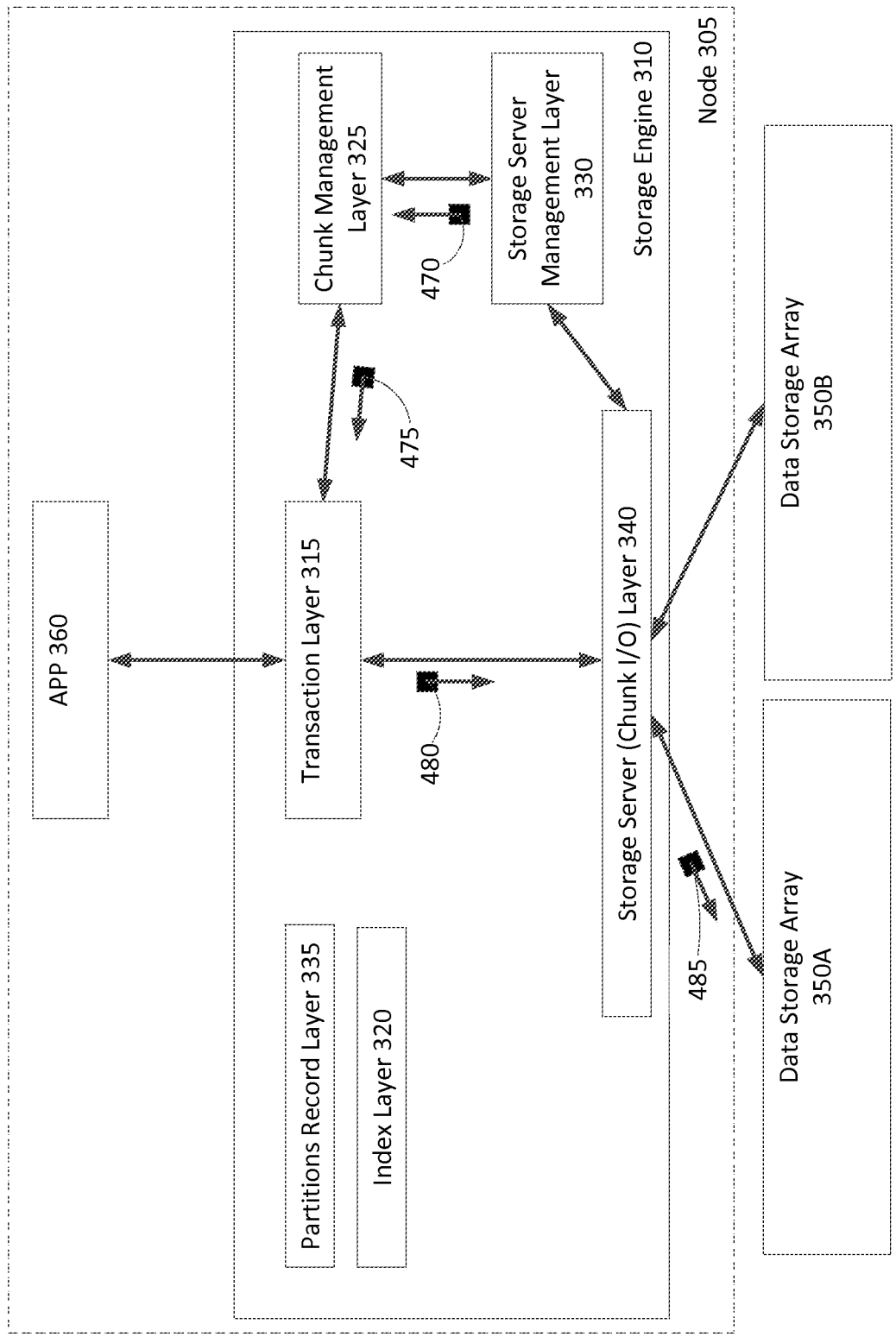
FIG. 4 is a simplified illustration of a node within a distributed data storage system processing a data I/O request, in accordance with an embodiment of the present disclosure.

Refer to the example embodiment of FIG. 4. FIG. 4 is a simplified illustration of a node within a distributed data storage system processing a data I/O request, in accordance with an embodiment of the present disclosure. As shown, storage server management layer 330 has allocated portions of data storage array 350 for use by Application 360. Storage server management layer 330 notifies chunk management layer 325 of the allocation of portions of data storage array 350 using message 470. Chunk management layer 325 notifies transaction layer 315 of the allocation of data storage array 350A and which portions of data storage array 350A are allocated for use by Application 360. Transaction layer 315 executes data I/O writes from application 360. Transaction layer 315 sends data I/O write request to storage server layer 340 using message 480. In this embodiment, storage server layer 340 enables communication with data storage array 350A and data storage array 350B. Storage Server Layer 340 processes message 480 and executes data I/O write on data storage Array 350A using message 485.

Figure 5:
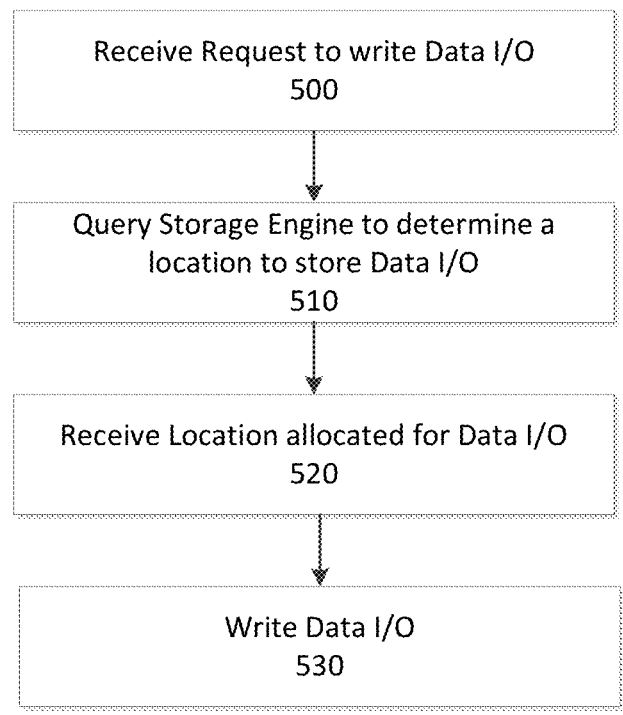
FIG. 5 is a simplified flowchart of a method of processing a data I/O write request on a node of a distributed data storage system as shown in FIG. 3, in accordance with an embodiment of the present disclosure.

Refer to the example embodiments of FIGS. 3 and 5. FIG. 5 is a simplified flowchart of a method of processing a data I/O write request on a node of a distributed data storage system as shown in FIG. 3, in accordance with an embodiment of the present disclosure. As shown in FIG. 3, transaction layer 315 within storage engine 310 receives a request to write Data I/O to storage accessible by Node 305 (Step 500). Transaction layer 315 queries chunk management layer 325 to determine a location to send data I/O write request (Step 510). Chunk management 325 makes a determination to write data I/O to data storage array 350A. Chunk management 325 queries storage server management 330 to determine which portions of data storage array 350A are used for received data I/O write request. Chunk management layer 325 notifies transaction layer 315 of location allocated for data I/O (Step 520). Transaction layer 315 facilitates write of data I/O (Step 530) using storage server layer 340 to write data I/O to data storage array 350A.

Figure 6:
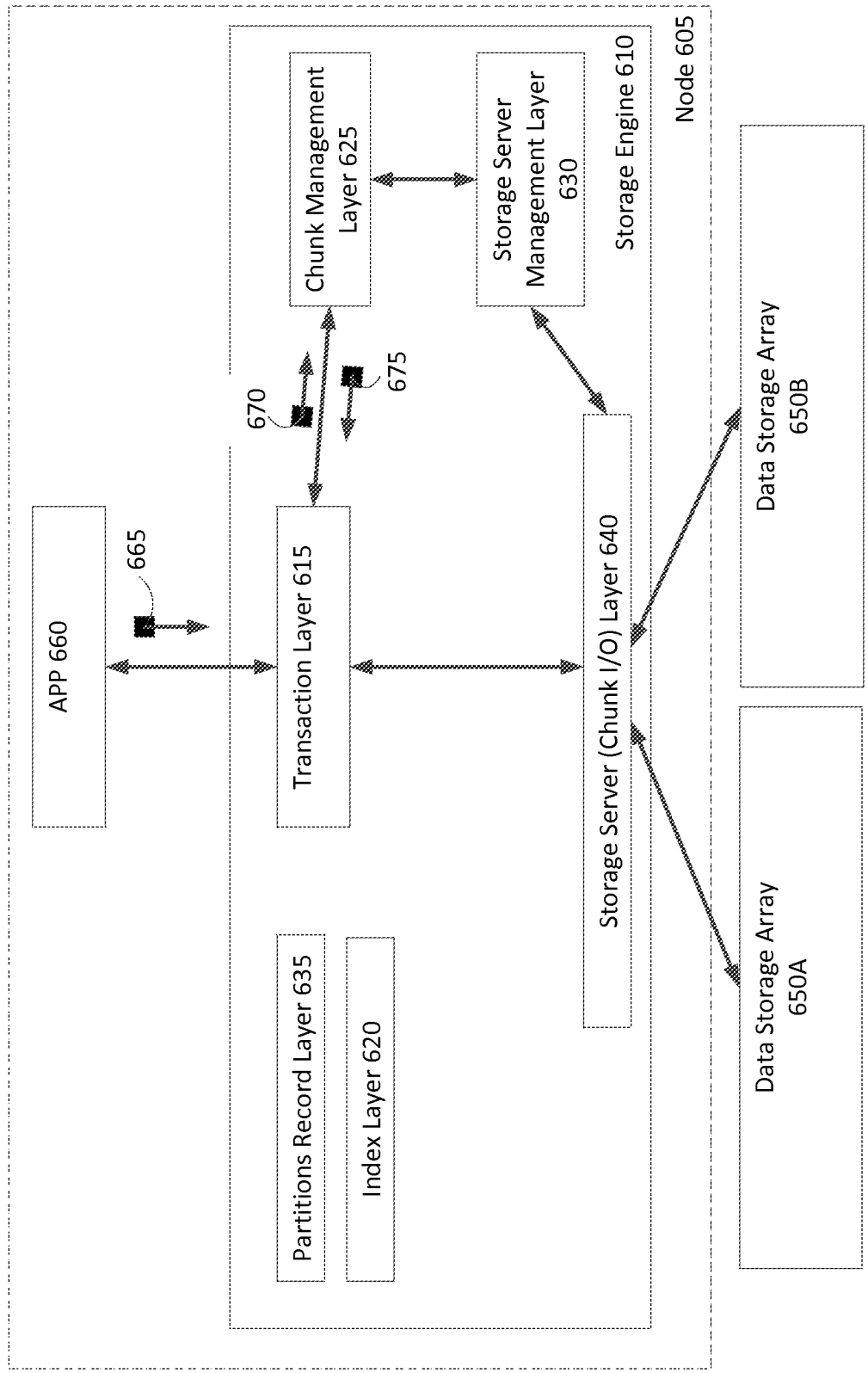
FIG. 6 is a simplified illustration of a data I/O read request within a node of a distributed data storage system, in accordance with an embodiment of the present disclosure.

Refer to the example embodiment of FIG. 6. FIG. 6 is a simplified illustration of a data I/O read request within a node of a distributed data storage system, in accordance with an embodiment of the present disclosure. As shown, Node 605 is executing application 660 and storage engine 610. Node 605 is in communication with data storage array 650A and data storage array 650B. Storage engine 610 includes partitions record layer 635, index layer 620, transaction layer 615, chunk management layer 625, storage server management layer 630, and storage server layer 640.

As shown, application 660 sends data I/O Read request using message 665. Transaction layer 615 receives data I/O read Request and queries chunk management layer 625 for a location of requested data I/O using message 670. Chunk management layer 625 searches internal indices to determine where, within the distributed data storage system, the requested data I/O is stored. Chunk management layer 625 returns a location to transaction layer 615 using message 675.

Figure 7:
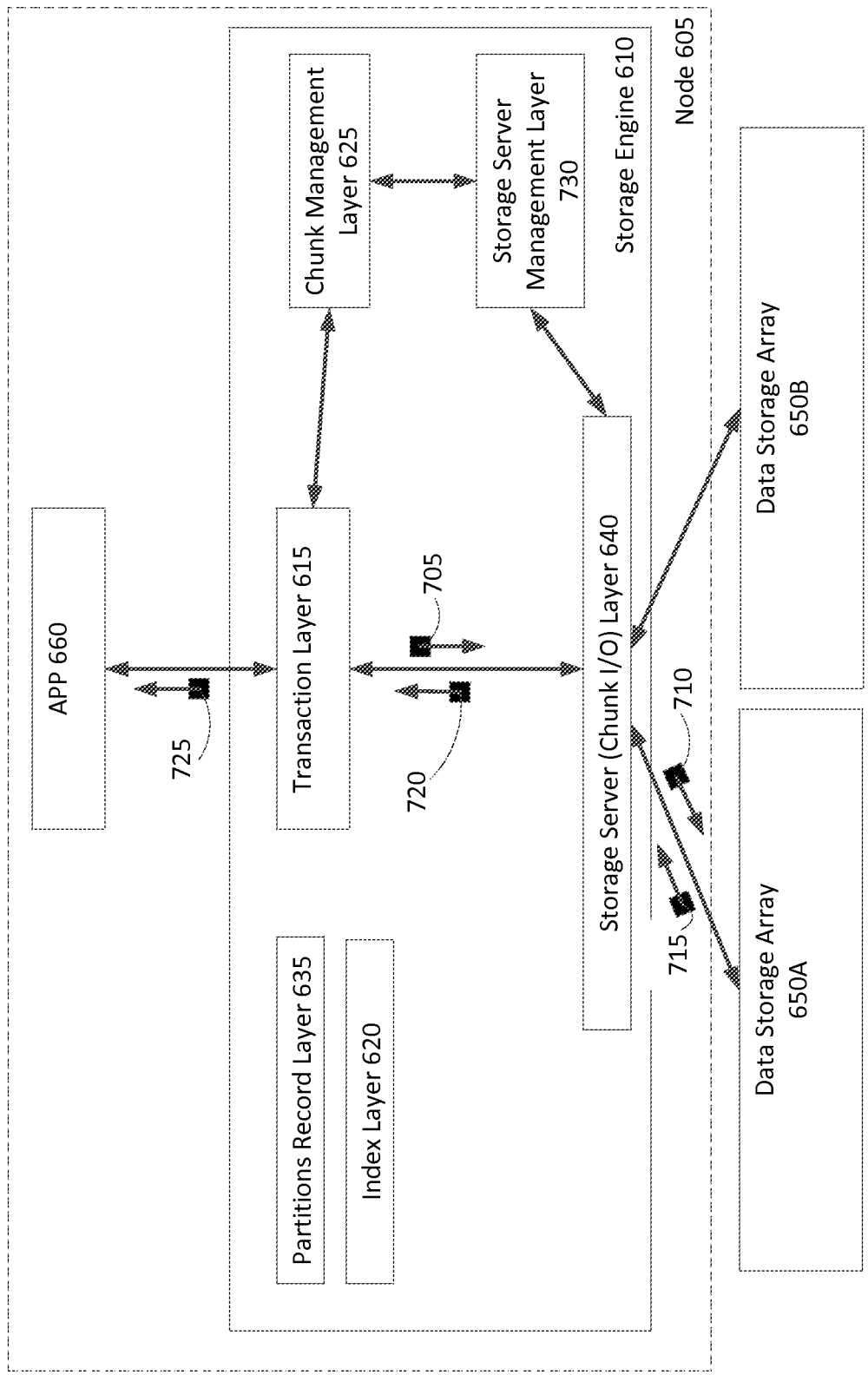
FIG. 7 is a simplified illustration of a node in a distributed data storage system processing a data I/O read request from an application, in accordance with an embodiment of the present disclosure.

Refer to the example embodiment of FIG. 7. FIG. 7 is a simplified illustration of a node in a distributed data storage system processing a data I/O read request from an application, in accordance with an embodiment of the present disclosure. In this embodiment, once transaction layer 615 receives a location of requested data I/O, transaction layer sends data I/O request to storage server layer 640 using message 705. Storage server layer 640 sends data I/O request to data storage array 650A using message 710. Data storage array 650A returns requested data I/O using message 715 and storage server layer 640 returns requested data I/O using message 720. Transaction layer 615 responds to application 660 with requested Data I/O in message 725.

Figure 8:
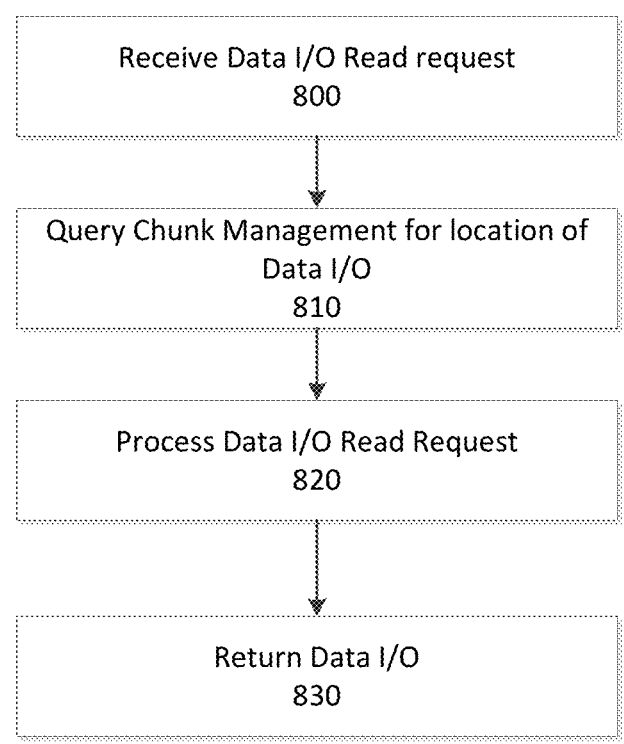
FIG. 8 is a simplified flowchart of a storage engine processing a data I/O read request at a node shown in FIG. 6, in accordance with an embodiment of the present disclosure.

Refer to the example embodiments of FIGS. 6 and 8. FIG. 8 is a simplified flowchart of a storage engine processing a data I/O read request at a node shown in FIG. 6, in accordance with an embodiment of the present disclosure. As shown, node 605 is executing application 660 and storage engine 610. Transaction layer 615 in storage engine 610 receives a data I/O read request from application 660 (Step 800). Transaction Layer 615 queries chunk management layer 625 to determine where the requested data I/O is located (Step 810). Upon determination of where requested data I/O is located, transaction layer 615 processes data I/O read request (Step 820) by using storage server layer 640 to communicate with data storage on the distributed data storage system. Upon completion of processing, Transaction Layer 615 returns requested data I/O to application 660 (Step 830).

The methods and apparatus of this invention may take the form, at least partially, of program code (i.e., instructions) embodied in tangible non-transitory media, such as floppy diskettes, CD-ROMs, hard drives, random access or read only-memory, or any other machine-readable storage medium.

Figure 9:
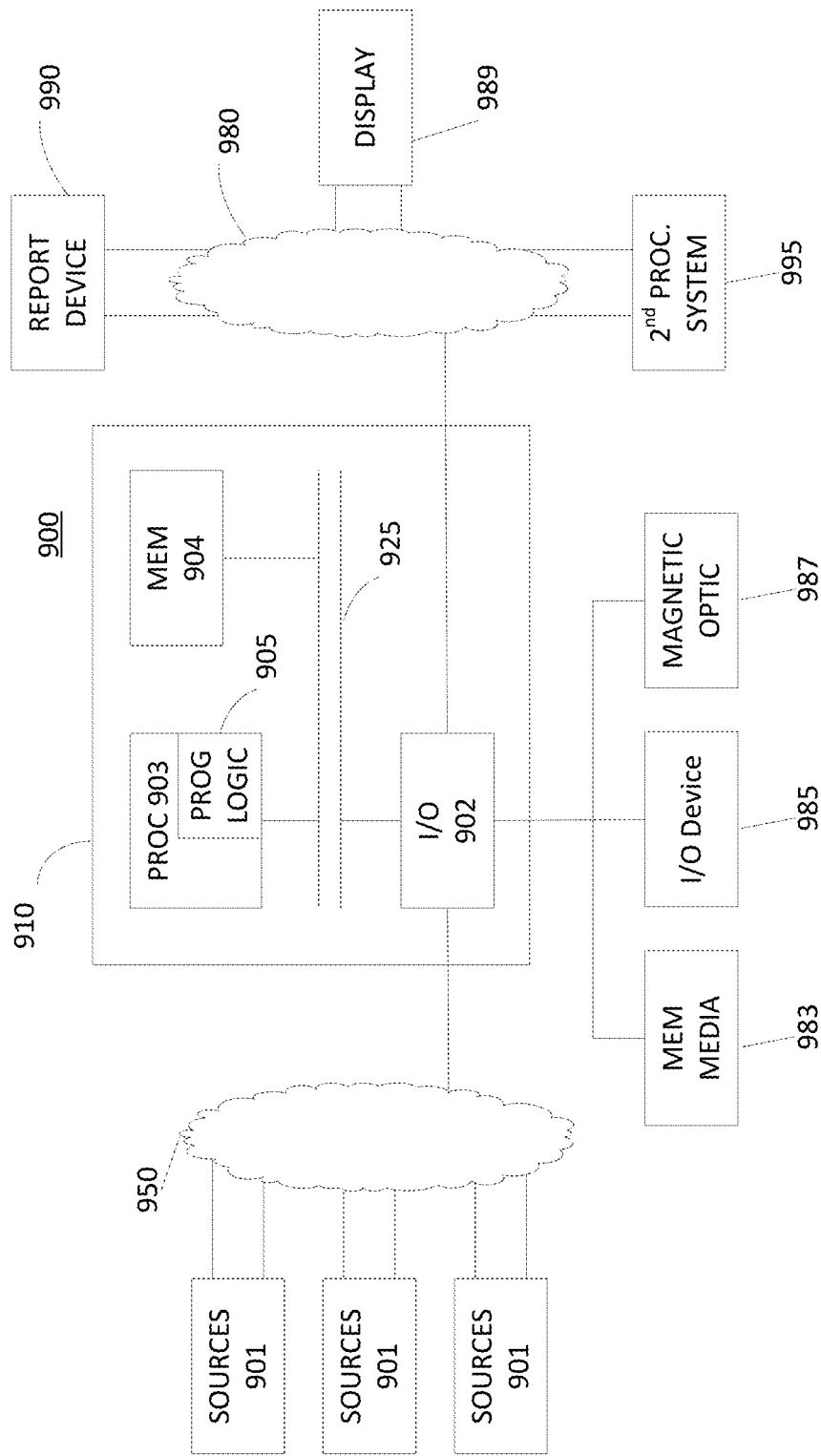
FIG. 9 is an example of an embodiment of an apparatus that may utilize the techniques described herein, in accordance with an embodiment of the present disclosure.

FIG. 9 is a block diagram illustrating an apparatus, such as a computer 910 in a network 900, which may utilize the techniques described herein according to an example embodiment of the present invention. The computer 910 may include one or more I/O ports 902, a processor 903, and memory 904, all of which may be connected by an interconnect 925, such as a bus. Processor 903 may include program logic 905. The I/O port 902 may provide connectivity to memory media 983, I/O devices 985, and drives 987, such as magnetic or optical drives. When the program code is loaded into memory 704 and executed by the computer 910, the machine becomes an apparatus for practicing the invention. When implemented on one or more general-purpose processors 903, the program code combines with such a processor to provide a unique apparatus that operates analogously to specific logic circuits. As such, a general purpose digital machine can be transformed into a special purpose digital machine.

Figure 10:
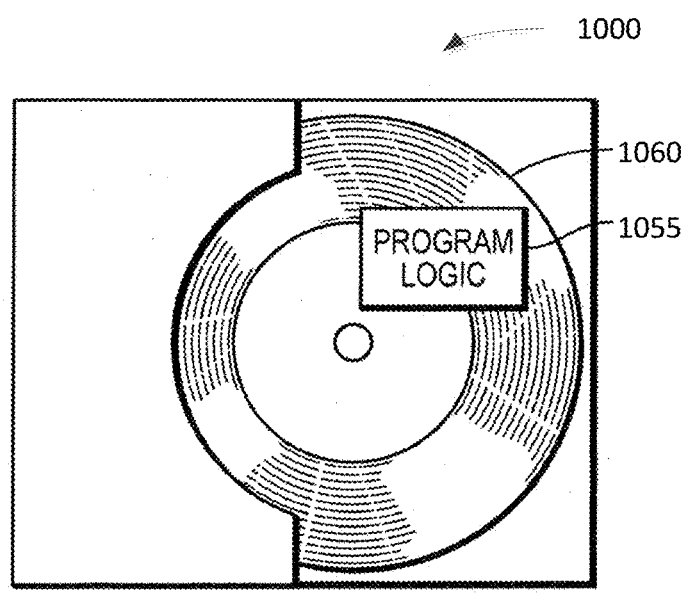
FIG. 10 is an example of a method embodied on a computer readable storage medium that may utilize the techniques described herein, in accordance with an embodiment of the present disclosure.

FIG. 10 is a block diagram illustrating a method embodied on a computer readable storage medium 1060 that may utilize the techniques described herein according to an example embodiment of the present invention. FIG. 10 shows Program Logic 1055 embodied on a computer-readable medium 1060 as shown, and wherein the Logic is encoded in computer-executable code configured for carrying out the methods of this invention and thereby forming a Computer Program Product 1000. Program Logic 1055 may be the same logic 905 on memory 904 loaded on processor 903 in FIG. 9. The program logic may be embodied in software modules, as modules, as hardware modules, or on virtual machines.

The logic for carrying out the method may be embodied as part of the aforementioned system, which is useful for carrying out a method described with reference to embodiments shown in, for example, FIGS. 1-10. For purposes of illustrating the present invention, the invention is described as embodied in a specific configuration and using special logical arrangements, but one skilled in the art will appreciate that the device is not limited to the specific configuration but rather only by the claims included with this specification.

Although the foregoing invention has been described in some detail for purposes of clarity of understanding, it will be apparent that certain changes and modifications may be practiced within the scope of the appended claims. Accordingly, the present implementations are to be considered as illustrative and not restrictive, and the invention is not to be limited to the details given herein, but may be modified within the scope and equivalents of the appended claims.

What is claimed is:

1. A computer-executable method of managing I/O requests in a distributed data storage system, including one or more processors and memory, wherein the distributed data storage system includes a first node of one or more nodes and one or more data storage arrays, the computer-executable method comprising:
   distributing, using one or more processors and memory from the distributed data storage system, metadata across the one or more data storage arrays, wherein the metadata is associated with data on the distributed data storage system and the associated I/O requests;
   receiving an I/O request at the first node enabled to utilize a storage engine to process the I/O request, wherein the storage engine is comprised of two or more layers, including a storage server management layer, wherein the storage server management layer detects hardware failures and notifies other management services of failures within the distributed data storage system;
   wherein the storage engine is in communication with storage engines on each of the one or more nodes:
   wherein managing of the distributed data storage system is enabled to be performed through any of the storage engines on each of the one or more nodes;
   analyzing the I/O request using a first layer of the two or more layers to determine whether the I/O request relates to a portion of metadata managed by the first layer of the two or more layers; and
   processing the I/O request based on the determination, wherein the processing comprises: upon a positive determination, selecting a first data storage array of the one or more data storage arrays; querying a second layer of the two or more layers to select a first portion of the first data storage array to service the I/O request; and communicating a response to a third layer enabled to process the I/O request based on the response; wherein processing of the I/O request includes routing the I/O request to the first portion of the first data storage array.

2. The computer-executable method of claim 1, wherein the processing comprises:
   upon a negative determination, querying the first layer for a second node in the distributed data storage system that manages a second portion of metadata related to the I/O request; and
   forwarding the I/O request to the second node for processing.

3. A system, comprising:
   a distributed data storage system including a first node of one or more nodes and one or more data storage arrays; and
   computer-executable program logic encoded in memory of one or more computers in communication with the distributed data storage system to enable management of I/O requests, wherein the computer-executable program logic is configured for the execution of:
      distributing metadata across the one or more data storage arrays, wherein the metadata is associated with data on the distributed data storage system and the associated I/O requests;
      receiving an I/O request at the first node enabled to utilize a storage engine to process the I/O request, wherein the storage engine is comprised of two or more layers, including a storage server management layer, wherein the storage server management layer detects hardware failures and notifies other management services of failures within the distributed data storage system;
      wherein the storage engine is in communication with storage engines on each of the one or more nodes;
      wherein managing of the distributed data storage system is enabled to be performed through any of the storage engines on each of the one or more nodes;
      analyzing the I/O request using a first layer of the two or more layers to determine whether the I/O request relates to a portion of metadata managed by the first layer of the two or more layers; and
      processing the I/O request based on the determination, wherein the computer-executable program logic is further configured for the execution of: upon a positive determination, selecting a first data storage array of the one or more data storage arrays; querying a second lay of the two or more layers to select a first portion of the first data storage array to service the I/O request; and communicating a response to a third layer enabled to process the I/O request based on the response; wherein processing of the I/O request includes routing the U/O request to the first portion of the first data storage array.

4. The system of claim 3, wherein the processing comprises:
   upon a negative determination, querying the first layer for a second node in the distributed data storage system that manages a second portion of metadata related to the I/O request; and
   forwarding the I/O request to the second node for processing.

5. A computer program product for managing I/O requests in a distributed data storage system, wherein the distributed data storage system includes a first node of one or more nodes and one or more data storage arrays, the computer program product comprising:
a non-transitory computer readable medium encoded with computer-executable program code for using read signatures in replication, the code configured to enable the execution of:
distributing metadata across the one or more data storage arrays, wherein the metadata is associated with data on the distributed data storage system and the associated I/O requests;
receiving an I/O request at the first node enabled to utilize a storage engine to process the I/O request, wherein the storage engine is comprised of two or more layers, including a storage server management layer, wherein the storage server management layer detects hardware failures and notifies other management services of failures within the distributed data storage system;
wherein the storage engine is in communication with storage engines on each of the one or more nodes;
wherein managing of the distributed data storage system is enabled to be performed through any of the storage engines on each of the one or more nodes;
determine whether the I/O request relates to a portion of metadata managed by the first layer of the two or more layers; and
processing the I/O request based on the determination, wherein the processing comprises: upon a positive determination, selecting a first data storage array of the one or more data storage arrays; querying a second layer of the two or more layers to select a first portion of the first data storage array to service the I/O request; and communicating a response to a third layer enabled to process the I/O request based on the response; wherein processing of the I/O request includes routing the I/O request to the first portion of the first data storage array.

6. The computer program, product of claim 5, wherein the processing comprises:
upon a negative determination, querying the first layer for a second node in the distributed data storage system that manages a second portion of metadata related to the I/O request; and
forwarding the I/O request to the second node for processing.

* * * * *